March 5, 1968 J. WIGINGTON 3,372,288

SEQUENTIAL SWITCHING WITH DELAY FOR CONTROLLED RECTIFIER CIRCUITS

Filed Aug. 24, 1964 3 Sheets-Sheet 1

INVENTOR.

Jerry Wigington

BY Marshall J. Breen

ATTORNEY

WITNESS

Nicholas Leszczak

March 5, 1968 J. WIGINGTON 3,372,288

SEQUENTIAL SWITCHING WITH DELAY FOR CONTROLLED RECTIFIER CIRCUITS

Filed Aug. 24, 1964 3 Sheets-Sheet 2

INVENTOR.
Jerry Wigington

WITNESS
Nicholas Leszczak

BY Marshall J. Breen
ATTORNEY

WITNESS
Nicholas Leszczak

INVENTOR.
Jerry Wigington
BY
Marshall J. Breen
ATTORNEY

United States Patent Office 3,372,288

Patented Mar. 5, 1968

3,372,288

SEQUENTIAL SWITCHING WITH DELAY FOR CONTROLLED RECTIFIER CIRCUITS

Jerry Wigington, Pickens, S.C., assignor to The Singer Company, New York, N.Y., a corporation of New Jersey Filed Aug. 24, 1964, Ser. No. 391,589
6 Claims. (Cl. 307—252)

ABSTRACT OF THE DISCLOSURE

A switching circuit employs a manually-operated sequential switch having two pairs of contacts and a single actuator for connecting and disconnecting an A.C. voltage to and from a circuit in which a semi-conductor rectifier having a signal current path controls a power current path to a load. The contact pairs are arranged mechanically to be closed and opened in a time sequence with a specified minimum time delay related to the period of the A.C. voltage. One pair of contacts applies A.C. voltage to the power current path and the other pair of contacts applies A.C. voltage to the signal current path.

This invention relates to sequential switching circuits and more particularly to switching circuits for connecting and disconnecting an A.C. voltage to and from a circuit in which a semiconductor controlled rectifier controls power current to a load.

It is desirable to utilize the switching function of the controlled rectifier itself to dynamically make and break the load current and thus relieve the mechanical switch contacts of this duty and yet retain the advantage of positively removing the source voltage from both the rectifier and the load.

According to this invention means are provided whereby the switch contacts for carrying the load current are always closed *before* the rectifier goes into its conducting state and are always opened *after* the rectifier goes into its blocking state.

In this manner the switch contacts may be simple low-cost elements since all destructive arcing is eliminated and the advantage of selective isolation of the circuit elements from the source voltage is retained. The use of a low-cost switch in mass-produced products such as portable electric tools, for example is a considerable economic advantage.

It is therefore an object of this invention to provide a switch and switching circuit for controlling the application of an A.C. voltage to a circuit in which a semiconductor controlled rectifier controls current to a load whereby the switch contacts are not required to dynamically make and break the load current.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 1:
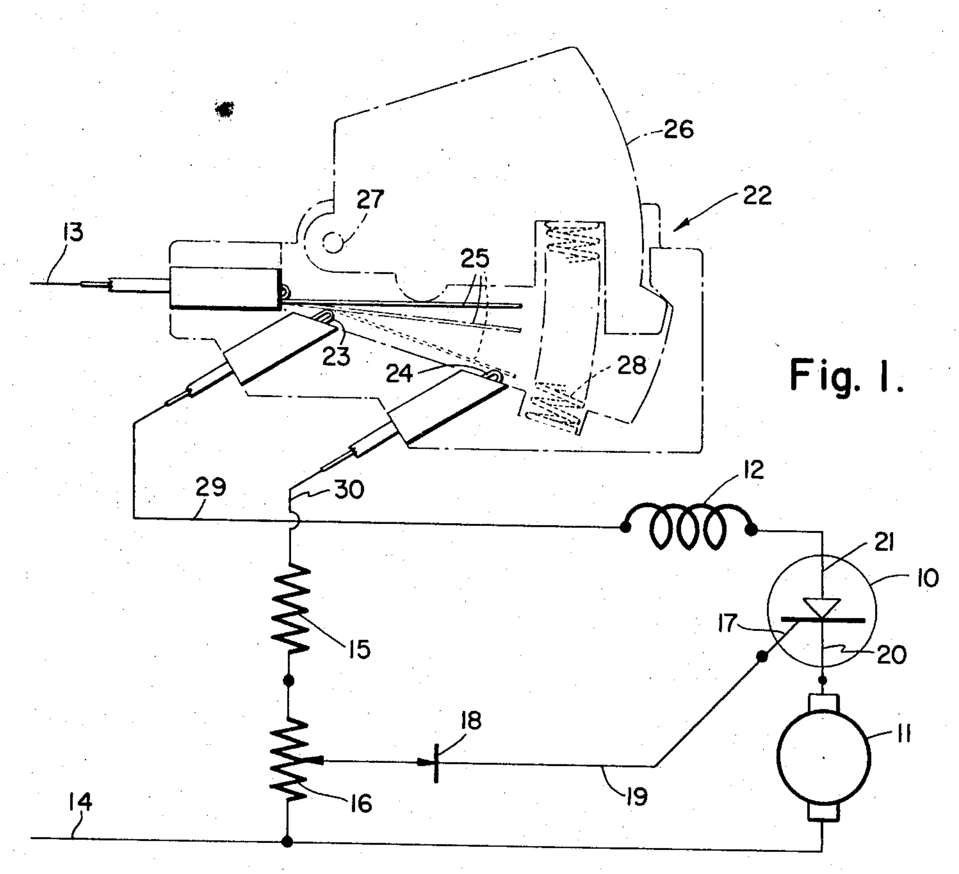

In the drawings, FIG. 1 is a diagrammatic illustration of an embodiment of this invention.

Figure 2:
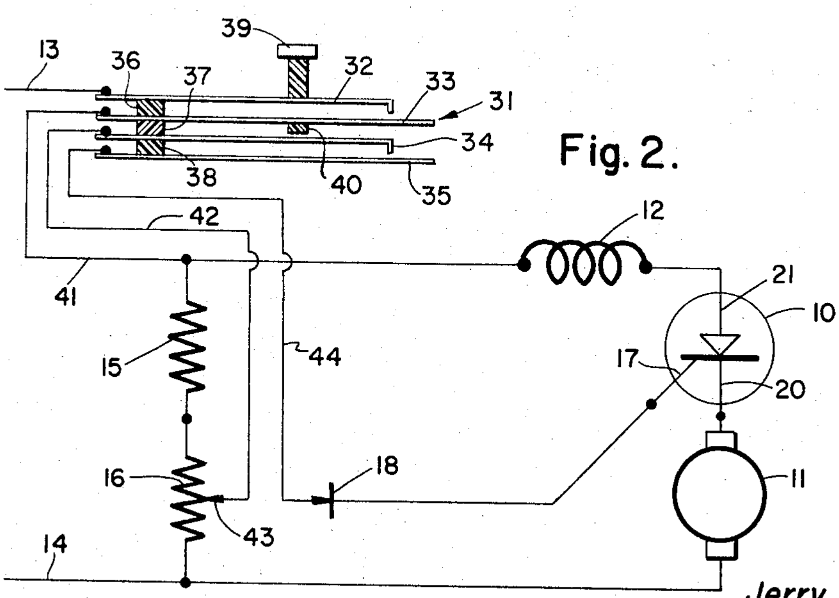

FIG. 2 is a circuit diagram illustrating another embodiment of this invention.

Figure 3:
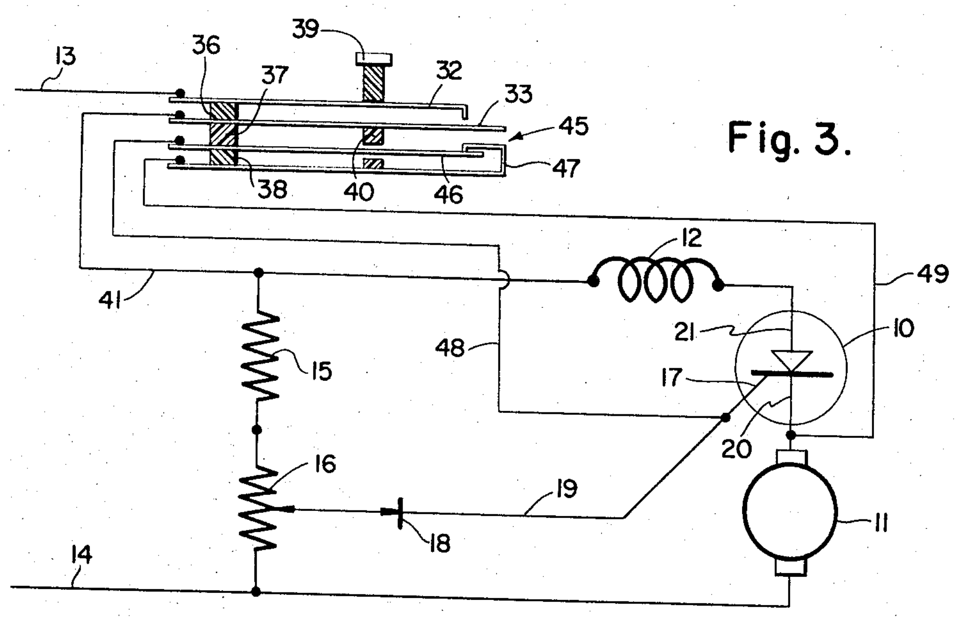
Figure 4:
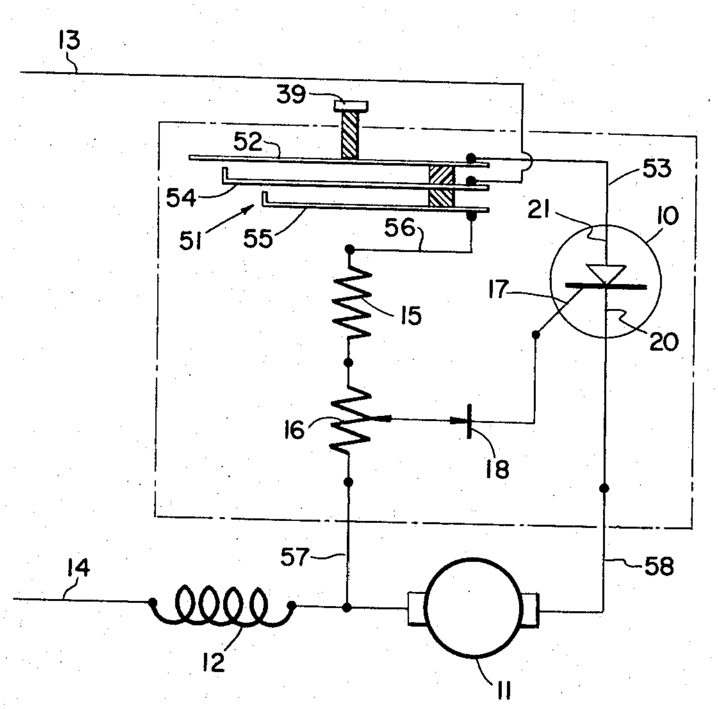
Figure 5:
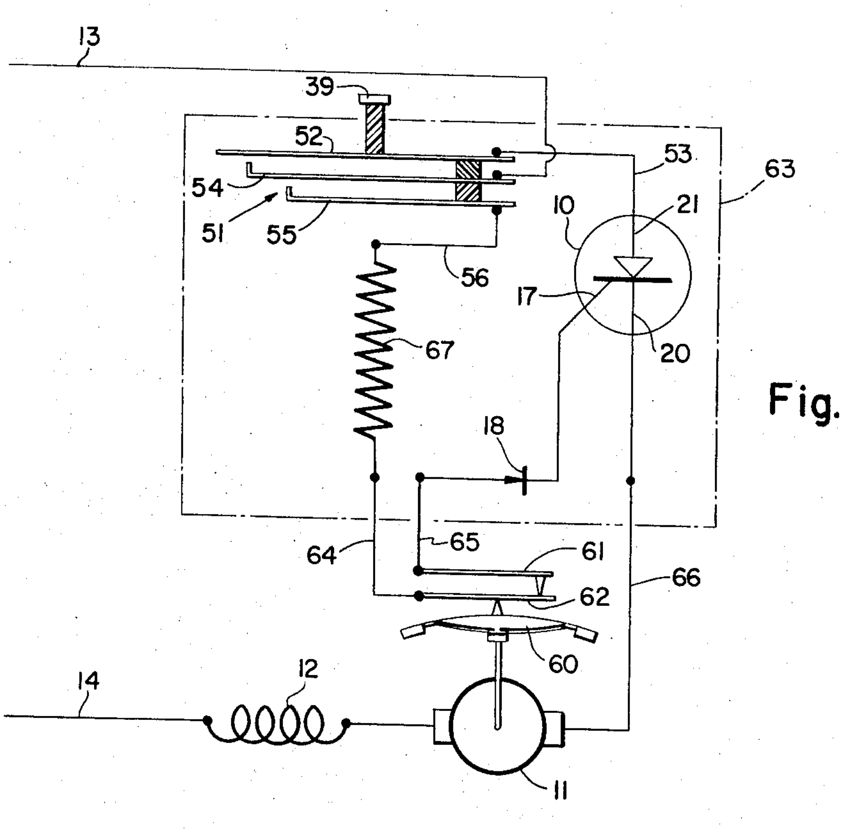

FIGS. 3, 4, and 5 are diagrams illustrating still further embodiments of this invention.

Figure 6:
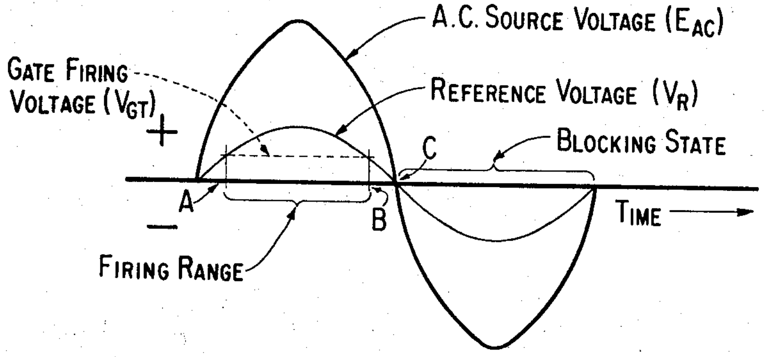

FIG. 6 is a diagram of the wave form of the source voltage to illustrate the minimum time delay required in the sequential switching function of this invention.

Referring now to FIG. 1, a circuit is shown in which a silicon controlled rectifier 10 controls the current supplied to an electric motor, having series-connected armature winding 11 and field winding 12, from a source of A.C. voltage (not shown) supplied to leads 13 and 14. A voltage divider comprising resistor 15 and potentiometer 16 supplies a reference voltage for firing the rectifier 10, which voltage is supplied to the gate 17 by way of diode 18 and lead 19 and to the cathode 20 by way of the armature winding 11. The anode 21 connects to the field winding 12.

This circuit is the same as that shown and described in the U.S. Reissue patent No. 25,203, assigned to the same assignee as that of the present invention, and reference may be had thereto for an understanding of its operation.

Ordinarily this prior art circuit is connected to an A.C. voltage source through a conventional single-pole, single-throw switch in one of the supply leads. Such a switch must be capable of switching the full load current and this requires snap action and special contact materials to prevent the deterioration and short life due to destructive arcing. There will now be described in reference to FIG. 1 a switching circuit which removes the above requirements and results in a long-life switch structure which has low-cost contacts and simple actuation.

A switch indicated generally as 22 in FIG. 1 has stationary contacts 23, 24 and a movable leaf contact 25. An insulated trigger 26 pivoted at 27 actuates the leaf contact 25 to bring it sequentially into contact with the contacts 23 and 24 as shown by the dot-dash and dotted lines in FIG. 1. A return spring 28 restores the trigger 26 to its original position when the trigger is released and, in so doing, breaks contact between the leaf 25 and stationary contacts 24 and 23 in reverse time sequence from their closure. An important aspect of the switch 22 is that there is a built-in time delay between the closure of contacts 25 and 23 and the subsequent closure of contacts 25 and 24 and similarly between the breaking of contacts 25 and 24 and the subsequent breaking of contacts 25 and 23. The differential spacing of the contacts 23 and 24 relative to the movement of leaf 25 and the accelerating capabilities of the combined trigger 26 and leaf 25 are such as to establish a minimum time delay of a value related to the frequency of the source A.C. voltage as will be explained presently.

The leaf contact 25 is connected to lead 13 and to one side of the A.C. source voltage (not shown). Contact 23 is connected to lead 29 and thence to the field winding 12. Contact 24 is connected to lead 30 and thence to the voltage divider 15, 16.

In operation, when the trigger 26 is depressed, contacts 25 and 23 close to apply the A.C. source voltage (not shown) to the series load current path comprising the field winding 12, anode 21, cathode 20 and the armature winding 11. However, no current flows initially in this circuit because there is no firing current flow into the gate 17 (contacts 25, 24 open) and the rectifier 10 is in its blocking state. Continued depression of the trigger 26 causes contacts 25 and 24 to close later and to apply a reference voltage between the gate 17 and the cathode 20 which voltage, if positive toward the gate and of sufficient magnitude, will then cause the rectifier 10 to conduct and supply load current to the motor windings 11 and 12. This is shown by the diagram of FIG. 6 which shows one complete cycle of A.C. source voltage (EAC) and reference voltage (VR). An assumed gate firing voltage (VGT) establishes a firing range from time A to time B. That is to say, if the A.C. source voltage and the reference voltage are applied by simultaneous closure of contacts 25, 23 and 25, 24, respectively, anywhere within the time range A to B, the rectifier 10 will fire and, although there is an inherent turn-on delay time in the rectifier itself of a few microseconds, the full load current is quickly established and the contacts 25, 23 would be required to dynamically switch this current. However, by delaying the closure of contacts 25, 24 until *after* contacts 25, 23 close, the contacts 25, 23 can be closed before the rectifier 10 fires and thus positively relieved of dynamic switching duty, the switching actually being performed by the rectifier itself. While any positive delay time may be sufficient for turn-on operation it is the turn-off operation of switch 22 which represents the "worst case" and determines the minimum delay time necessary to insure that contacts 25, 23 do not have to break the load current because the rectifier will have returned to its blocking state in time before contacts 25, 23 are opened. For example, if contacts 25, 24 and 25, 23 were to be opened simultaneously anywhere in the firing range A to B, the contacts 25, 23 would be required to break the load current. Note also that, even if contacts 25, 24 were opened shortly after point A and the opening of contacts 25, 23 were delayed until point B, the contacts 25, 23 would still be required to break the load current because, when once the rectifier turns on, the gate loses control and turn-off can only occur when the anode-cathode voltage goes substantially to zero such as at point C. However, if the delay between the opening of contacts 25, 24 and the openings of contacts 25, 23 is made greater than the time between point A and C, the rectifier will have returned to its blocking state as indicated in FIG. 6 by the time contacts 25, 23 are opened and the contacts will open under zero current conditions and this is the desirable mode of operation. Since for very sensitive rectifiers the gate firing voltage VGT is small, the point A will approach the beginning of the cycle and the practical minimum delay time becomes equal to the time from A to C, which is the period of one-half cycle of the A.C. source voltage. This then establishes a criterion for the delay between sequential actuations of the contacts 25, 23 and 25, 24 of the switch 22. For a 60 cycle per second A.C. voltage, this minimum delay amounts to about .0083 second and can readily be obtainable by ordinary differential spacing of switch contacts without resorting to dash pots, eddy current effects or other special time delay devices.

While a single-pole, three-terminal switch, such as 22, is shown in FIG. 1, other switch arrangements may be used for obtaining the necessary sequential switching function of this invention. For example, FIG. 2 shows a two-pole leaf switch 31 used in another embodiment of the invention. In this case the switch comprises four leaf springs 32, 33, 34 and 35 secured by insulated spacers 36, 37, 38 and actuated in sequence by a single push button 39. It is obvious that leaf 32 must contact leaf 33 before the latter can be flexed enough to transmit its movement through insulated button 40 to move leaf 34 into contact with leaf 35. The leaf 32 is connected through lead 13 to one side of the A.C. source voltage (not shown). The leaf 33 is connected through lead 41 to the field winding 12 and to one end of resistor 15. The leaf 34 is connected through lead 42 to the slider 43 of potentiometer 16. The leaf 35 is connected through lead 44 to the gate diode 18. It will be seen that, in FIG. 2, the leaf contacts 32 and 33 control the application of source voltage to the power or load current path comprising series connected field winding 12, anode 21, cathode 20 and armature winding 11, and also to the voltage divider path comprising resistor 15 and potentiometer 16. The leaf contacts 34 and 35 control the signal current path for selectively applying a firing signal to the gate 17. In this case the blocking state of the rectifier 10 is maintained by keeping the signal current path open until after the A.C. voltage has been applied to the power current path.

It is also possible to maintain the blocking state of the rectifier 10 by applying a selective short-circuit across the gate 17 and cathode 20 and this method is used in the circuit of FIG. 3 which will now be described.

In FIG. 3 a switch 45 is used which is a double-pole, leaf type having one pair of contacts normally open and the other pair of contacts normally closed. This switch 45 is the same as switch 31 of FIG. 2 except for leaf contacts 46 and 47 which are arranged to be normally closed as shown. Leaf contact 46 is connected through lead 48 to the gate 17 and leaf contact 47 is connected through lead 49 to the cathode 20. With this arrangement the rectifier 10 is maintained in its blocking state until *after* leaf contacts 32 and 33 are closed and, on reverse operation, the leaf contacts 46 and 47 are closed in time *before* leaf contacts 32 and 33 are opened so that the rectifier 10 reverts to its blocking state and contacts 32 and 33 are not required to dynamically break the load current.

In FIG. 4 an arrangement according to this invention is shown in which a printed circuit board 50 is used to mount and connect the circuit components 10, 15, 16 and 18. A three-leaf contact switch 51, which may also be mounted on the circuit board 50, is used in this embodiment and results in a low-cost, compact assembly especially useful where space is at a premium. The sequential switch 51 is essentially the equivalent of the switch 22 of FIG. 1 and comprises a top leaf contact 52 connected by printed lead 53 to the anode 21, an intermediate leaf contact 54 connected by lead 13 to one side of the A.C. voltage source (not shown), and a bottom leaf contact 55 connected by printed lead 56 to the resistor 15. Leads 57 and 58 connect the circuit board wiring with the motor windings 11 and 12, and lead 14 connects the field winding 12 with the other side of the A.C. voltage source (not shown). The specific motor control circuit of FIG. 4 is the same as that shown and described in the United States patent application Ser. No. 353,102, filed Mar. 19, 1964 now U.S. Patent No. 3,302,088, and assigned to the same assignee as that of the present invention.

FIG. 5 shows an arrangement very similar to that of FIG. 4 except that, in this case, the motor speed is controlled by a mechanical governor 60 which operates on over-speed to open contacts 61 and 62 which action removes the signal current to the gate 17 to control the firing of the rectifier 10 and thus regulates the motor speed. A printed circuit board 63 mounts the switch 51 and circuit components. Connections to the governor contacts 61 and 62 and to the motor armature are made through leads 64, 65 and 66. In this case, a single current-limiting resistor 67 may be used in place of the voltage divider elements 15 and 16 of FIG. 4. The sequential leaf contact switch 51 is mounted directly on the board 63. Operation is the same as that of FIG. 4 except that the speed is regulated by the governor 60 instead of by the armature back e.m.f. as in FIG. 4.

It will be apparent from the above that there is provided according to this invention a method and circuit means for connecting and disconnecting an A.C. voltage to and from a circuit in which a semiconductor rectifier controls the power current to a load and in which the isolating switch is not required to make or break the load current and hence may be of simple, low-cost structure and still have a long useful life.

Having thus described the nature of the invention, what I claim herein is:

1. A sequential switching circuit for controlling the application of an A.C. voltage to a circuit in which a controlled rectifier having an anode, a cathode, and a gate controls current to a load comprising; a first circuit including said anode and cathode connected in series with said load; a second circuit including an impedance of which at least a portion is connected in series with said gate and cathode; and manually-selective sequential switch means for applying said A.C. voltage to said first circuit before its application to said second circuit and for removing said A.C. voltage from said second circuit before its removal from said first circuit, said delay time being at least equal to the period of one-half cycle of the A.C. voltage.

2. In a circuit including a semiconductor controlled rectifier having an anode, a cathode, and a gate for supplying current to a load from an A.C. voltage; means for selectively connecting and disconnecting said circuit to and from said A.C. voltage comprising; a sequential make and break switch for first connecting the anode and cathode in series with said load and said A.C. voltage and after a time delay for connecting at least a portion of said A.C. voltage in series with the gate and cathode, said time delay being at least equal to the period of one-half cycle of the A.C. voltage.

3. A sequential switching circuit for connecting and disconnecting an A.C. voltage to a circuit for supplying power to a load through a controlled rectifier having an anode, a cathode, and a gate, comprising; a first circuit including the anode, the cathode, and the load connected in series; a second circuit including an impedance connected in series with the gate and the cathode; mechanical switch means for sequentially applying said A.C. voltage first to said first circuit and, after a predetermined time delay, also to said second circuit, said time delay being at least equal to the period of one-half cycle of the A.C. voltage; said switch means effecting sequential removal of said A.C. voltage from said first and second circuits in reverse order and including said time delay between removals.

4. In a circuit for controlling the flow of power current to a load from an A.C. voltage through a controlled rectifier having an anode, a cathode, and a gate; a power current path including an isolation switch, the anode, the cathode, and the load, connected in series circuit with said A.C. voltage; a signal current path including an impedance, the gate and the cathode, connected in series circuit with said A.C. voltage; means for closing the isolation switch a predetermined time before closing said signal current path and for opening said signal current path a predetermined time before opening said isolation switch, said predetermined time being at least equal to the period of one-half cycle of the A.C. voltage.

5. In a circuit for controlling the flow of power current to a load from an A.C. voltage through a controlled rectifier having a gate for controlling the firing thereof; a first circuit including said rectifier for supplying power current to the load; a second circuit for supplying firing current to said gate; switch means having two pairs of contacts for connecting said A.C. voltage respectively to said first and second circuits in predetermined time sequence such that the first circuit is conneteed and disconnected only when the second circuit is disconnected from said A.C. voltage, the time delay being at least equal to the period of one-half cycle of the A.C. voltage.

6. In a circuit for controlling the flow of power current to a load from an A.C. voltage through a controlled rectifier having an anode, a cathode, and a gate; means for connecting and disconnecting said A.C. voltage to and from said circuit only when said rectifier is non-conducting, said means comprising a switch having two pairs of contacts, the first pair being normally open and in series with the power current path and the second pair being normally closed and connected respectively to said gate and cathode; and means for operating said contact pairs in predetermined time sequence with a time delay at least equal to the period of one-half cycle of the A.C. voltage.

References Cited

UNITED STATES PATENTS

| | | | |
|---|---|---|---|
| Re. 25,203 | 7/1962 | Momberg et al. | 318—345 X |
| 1,708,996 | 4/1929 | Armstrong | 200—144 |
| 2,789,253 | 4/1957 | Vang | 317—11 |
| 3,122,659 | 2/1964 | Krestel et al. | 317—11 X |

ARTHUR GAUSS, *Primary Examiner.*

S. MILLER, *Assistant Examiner.*